United States Patent
Erdman et al.

(10) Patent No.: US 11,795,310 B2
(45) Date of Patent: Oct. 24, 2023

(54) PROCESS FOR MAKING SHAPED ARTICLES

(71) Applicant: Multy Home Limited Partnership, Concord (CA)

(72) Inventors: Derek Erdman, North York (CA); Stephen Dixon, Oakville (CA)

(73) Assignee: MULTY HOME LIMITED PARTNERSHIP, Concard (CA)

( * ) Notice: Subject to any disclaimer, the term of this patent is extended or adjusted under 35 U.S.C. 154(b) by 1188 days.

(21) Appl. No.: 16/463,569

(22) PCT Filed: Nov. 23, 2017

(86) PCT No.: PCT/CA2017/051410
§ 371 (c)(1),
(2) Date: May 23, 2019

(87) PCT Pub. No.: WO2018/094527
PCT Pub. Date: May 31, 2018

(65) Prior Publication Data
US 2019/0276651 A1  Sep. 12, 2019

Related U.S. Application Data

(60) Provisional application No. 62/444,998, filed on Jan. 11, 2017, provisional application No. 62/426,264, filed on Nov. 24, 2016.

(51) Int. Cl.
| | | |
|---|---|---|
| B29B 7/74 | (2006.01) | |
| C08L 23/12 | (2006.01) | |
| B29B 7/38 | (2006.01) | |
| B29B 7/82 | (2006.01) | |
| B29B 9/04 | (2006.01) | |
| B29B 9/16 | (2006.01) | |
| C08L 9/06 | (2006.01) | |
| B29K 23/00 | (2006.01) | |
| B29K 105/26 | (2006.01) | |
| C08L 23/16 | (2006.01) | |

(52) U.S. Cl.
CPC ............... *C08L 23/12* (2013.01); *B29B 7/38* (2013.01); *B29B 7/7495* (2013.01); *B29B 7/82* (2013.01); *B29B 9/04* (2013.01); *B29B 9/16* (2013.01); *C08L 9/06* (2013.01); *B29K 2023/00* (2013.01); *B29K 2105/26* (2013.01); *C08L 23/16* (2013.01); *Y02W 30/62* (2015.05)

(58) Field of Classification Search
CPC .......... B29B 9/04; B29B 7/82; B29B 7/7495; B29B 9/16; B29B 7/38; C08L 9/06; C08L 23/12; C08L 23/16; Y02W 30/62; B29K 2023/00; B29K 2105/26
See application file for complete search history.

(56) References Cited

U.S. PATENT DOCUMENTS

| | | | |
|---|---|---|---|
| 4,555,552 A * | 11/1985 | Coran | ................. C08G 18/831 525/63 |
| 4,795,603 A | 1/1989 | Nagayasu | |
| 5,157,082 A | 10/1992 | Johnson | |
| 5,312,573 A | 5/1994 | Rosenbaum et al. | |
| 5,514,721 A | 5/1996 | Hart | |
| 5,523,328 A | 6/1996 | Rosenbaum et al. | |
| 5,635,125 A | 6/1997 | Ternes et al. | |
| 5,733,943 A | 3/1998 | Doan | |
| 5,861,117 A | 1/1999 | Rosenbaum | |
| 6,015,861 A | 1/2000 | Mertzel et al. | |
| 6,384,145 B1 | 5/2002 | Mertzel et al. | |
| 6,495,635 B1 | 12/2002 | Edson | |
| 6,573,303 B2 | 6/2003 | Liu et al. | |
| 7,790,784 B2 | 9/2010 | Nasr et al. | |
| 8,304,461 B2 | 11/2012 | Cruz et al. | |
| 9,079,347 B2 | 7/2015 | Chow | |
| 2001/0008322 A1 | 7/2001 | Rosenbaum | |
| 2010/0065044 A1 | 3/2010 | Reader et al. | |
| 2010/0102468 A1 | 4/2010 | Chen | |
| 2011/0185662 A1 | 8/2011 | Mollinger et al. | |
| 2013/0237633 A1 | 9/2013 | Tamir | |
| 2016/0237260 A1 * | 8/2016 | Welle, IV | ............... C08L 17/00 |
| 2016/0305074 A1 | 10/2016 | Chow | |

FOREIGN PATENT DOCUMENTS

| | | |
|---|---|---|
| CN | 105175976 A | 12/2015 |
| GB | 2476576 A | 6/2011 |
| WO | 2013/121243 A2 | 8/2013 |
| WO | 2016151301 A1 | 9/2016 |

OTHER PUBLICATIONS

International Search Report, PCT/CA2017/051410, dated Feb. 26, 2018 (2 pp.).

* cited by examiner

*Primary Examiner* — Monica A Huson
(74) *Attorney, Agent, or Firm* — Eversheds Sutherland (US) LLP

(57) ABSTRACT

Methods of making an environmentally acceptable shaped article. In an embodiment method comprises machining a sheet comprising crumb rubber within a polyolefin matrix into a plurality of particles to form a reground mixture; and processing the reground mixture at an elevated temperature into a mold to form said shaped article, wherein the shaped article has a substantially more evenly dispersed mixture of said crumb rubber within the matrix of said shaped article than within the matrix of said sheet or the particles of the reground mixture.

30 Claims, No Drawings

PROCESS FOR MAKING SHAPED ARTICLES

FIELD OF THE INVENTION

This invention relates to a process for making shaped articles from a mixture of crumb rubber and thermoplastic materials and related shaped articles.

BACKGROUND OF THE INVENTION

It is environmentally favorable to use recycled rubber, especially from old tires, in order not to fill landfills. Recycled tire crumb rubber is used in a variety of applications inclusive of making articles, or as a paving material and in paving systems where polymer materials may additionally be added. For example, U.S. Pat. No. 5,157,082 teaches a polymeric composition utilizing functionalized olefin polymer; U.S. Pat. No. 5,312,573 teaches a two part extrusion method to form articles of rubber and thermoplastic material; and U.S. Pat. No. 9,079,347 teaches the use of crumb rubber and polyolefin in an injection molding method to make a paving block.

It would be desirable to provide an improved alternate method utilizing crumb rubber, not only from recycled tires or instead of from recycled tires, to make a variety of articles for indoor and outdoor use that have more desirable physical and environmental properties and surface texture. Such resultant articles would be more desirable and environmentally friendly.

SUMMARY OF THE INVENTION

In aspects a method for making a shaped article is presented, whereby the shaped article has desirable pliability, weather/water resistance and a substantially more even esthetic surface texture with respect to smoothness and reduced/decreased/minimal surface irregularities and substantially more even porosity, reduced porosity compared with articles fabricated by other processes.

In an aspect the shaped article is made a ground particulate composition of crumb rubber and granular polyolefin. In some aspects, from a double grind (regrind) of crumb rubber and granular polyolefin. In this manner the shaped article has a more substantially homogeneous dispersion of the crumb rubber throughout a polyolefin matrix and throughout the shaped article thus leading to better and more desirable esthetic, physical and environmental characteristics/properties as described herein.

In a further aspect the aspect the shaped article is made from a single or double grind (regrind) composition comprising crumb rubber and granular polyolefin. The crumb rubber may comprise EPDM. In this manner the shaped article has a further substantially homogeneous dispersion of the crumb rubber due to the EPDM throughout a polyolefin matrix and throughout the shaped article thus leading to better and more desirable characteristics/properties as well as being environmentally desirable and in compliance with REACH (Registration, Evaluation, Authorisation and Restriction of Chemicals) in order to decrease potential negative impacts on human health or the environment in the process of manufacturing products of the invention.

This can be achieved in one aspect by a method whereby an initial (first) dry ground composition of crumb rubber and granular polyolefin, where the crumb rubber is dispersed substantially evenly throughout the granular polyolefin, is extruded under heat into a sheet/film/ribbon having the crumb rubber substantially evenly dispersed within/throughout a polyolefin matrix that is cooled and then further mechanically processed into a regrind composition comprising a plurality of particles, wherein each particle has crumb rubber substantially evenly dispersed within a polyolefin matrix. The dry regrind composition as a whole has a more even dispersion of the crumb rubber within the polyolefin matrix than the extruded sheet/film/rubber. The regrind composition is then injection molded in a mold (comprising a cavity) under heat to form a shaped article, whereby the formed shaped article has a substantially homogeneous dispersed mixture of said crumb rubber within the polyolefin matrix throughout the entire formed shaped article as compared to the extruded sheet or to the regrind composition of the plurality of particles. The method provides for a ground composition having a first homogeneity with respect to the uniformity of distribution of crumb rubber and granular polyolefin and also provides a regrind composition of particles where in each particle the crumb rubber is substantially evenly dispersed throughout the polyolefin matrix, thus more even dispersion of the crumb rubber than the initial ground composition. Lastly, the formed shaped article comprises the most desired substantially homogeneous dispersion of the crumb rubber within the polyolefin matrix throughout the shaped article.

According to an aspect of the invention is a double ground composition comprising a plurality of particles, wherein each particle has crumb rubber dispersed within a polyolefin matrix.

According to another aspect of the invention is a method of making a shaped article, the method comprising:

machining a sheet comprising crumb rubber within a polyolefin matrix into a plurality of particles to form a reground mixture; and processing the reground mixture at an elevated temperature into a mold to form said shaped article, wherein the shaped article has a substantially more evenly dispersed mixture of said crumb rubber within the matrix of said shaped article than within the matrix of said sheet or said reground mixture.

According to another aspect of the invention is a method of making a shaped article, the method comprising:

feeding a ground mixture of crumb rubber and granular polyolefin into a barrel and screw extruder and heating said mixture to a temperature of about 150° C. to about 220° C.;

conveying the heated mixture along the barrel to a die to extrude a sheet;

cooling said sheet, wherein said sheet comprises a dispersed mixture of said crumb rubber within a polyolefin matrix;

grinding said sheet to a plurality of shaped particles and conveying said shaped particles along a second barrel through a nozzle into a mold to make a shaped article, wherein said shaped article has a substantially more evenly dispersed mixture of said crumb rubber within the matrix of said shaped article than within the matrix of said sheet.

In any aspect of the invention the crumb rubber is up to about 10, 20, 30, 40, 50, 60, 70 or 80 mesh.

In any aspect of the invention the crumb rubber is up to about 20 mesh.

In any aspect of the invention the crumb rubber is recycled rubber.

In any aspect the rubber is selected from the group consisting of styrene-butadiene rubber (SBR), ethylene propylene diene rubber (EPDM), ethylene propylene rubber (EPR), butadiene rubber (BR) and mixtures thereof.

In any aspect the rubber SBR is from ground scrap/used tires.

In any aspect the rubber is EPDM.

In any aspect the EPDM provides reduced PAH emissions.

In any aspect the EPDM provides reduced PAH emissions compared to SBR as from scrap/used tires.

In any aspect of the invention the polyolefin has a melt index ranging between about 5 g/10 minutes to about 50 g/10 minutes.

In any aspect of the invention the polyolefin is selected from the group consisting of polyethylene, polypropylene, polybutene, polyisoprene, polypentene and mixtures thereof.

In any aspect of the invention the polyolefin is polyethylene.

In aspects, functionalized olefin polymers are not incorporated herein.

In any aspect of the invention the crumb rubber is provided in a range of about 50%-80% by weight in said sheet and/or shaped article.

In any aspect of the invention the crumb rubber is provided in a range of about 40% to 60% by weight in said sheet and/or shaped article.

In any aspect of the invention the crumb rubber is provided in an amount of about 50% by weight in said sheet and/or shaped article.

In any aspect of the invention about 15% to 60% or 15% to about 40% polyolefin is provided in said sheet and/or shaped article.

In any aspect of the invention about 50% by weight polyolefin is provided in said sheet and/or shaped article.

In any aspect of the invention the sheet and/or said shaped article further comprises up to about 10% by weight additives.

In any aspect of the invention the additives are selected from the group consisting of titanium dioxide, UV stabilizers, calcium carbonate, talc and flame retardants.

In any aspect of the invention the sheet and/or shaped article further comprises up to about 10% by weight colorants.

In any aspect of the invention the elevated temperature/heat is about 150° to about 220° C., in aspects about 180° C.

In any aspect of the invention the sheet is fabricated from a mixture of crumb rubber and granular polyolefin.

In any aspect of the invention the machining is selected from grinding, milling, pulverizing, and/or granulating.

In any aspect of the invention processing to form the article comprises injection molding.

In any aspect of the invention processing is injection molding using a barrel and screw, single or double.

In any aspect of the invention the sheet has a thickness of up to about 2 inches, up to about 1 inch, up to about ¾ of an inch, up to about ½ inch or up to about ¼ inch.

In any aspect of the invention sheet is formed by extrusion of a mixture of dry crumb rubber and granular polyolefin.

In aspects of the invention is a double ground composition comprising a plurality of particles, wherein each particle has crumb rubber dispersed within a polyolefin matrix. In aspects the crumb rubber comprises EPDM. In further aspects the crumb rubber consists of EPDM.

According to another aspect of the invention is a shaped article comprising an injection molded composition of a substantially homogeneous mixture of reground rubber crumb within a reground polyolefin matrix, wherein said reground rubber crumb is substantially evenly distributed within the reground polyolefin matrix throughout substantially the entire formed article.

According to another aspect of the invention is a shaped article comprising an injection molded composition of a substantially homogeneous mixture of reground EPDM rubber crumb within a reground polyolefin matrix, wherein said reground rubber crumb is substantially evenly distributed within the reground polyolefin matrix throughout substantially the entire formed article.

According to another aspect of the invention is a shaped article comprising an injection molded composition of a substantially homogeneous mixture of reground rubber crumb comprising EPDM within a reground polyolefin matrix, wherein said reground rubber crumb is substantially evenly distributed within the reground polyolefin matrix throughout substantially the entire formed article.

In aspects the article is pliable or has some pliability.

In aspects the article is substantially water resistant.

In aspects the article has a substantially even surface texture.

In aspects the article is minimally porous, or rather has decreased porosity compared to conventional rubber articles.

In aspects, the article has less than 1.0 ppm PAH.

In aspects, the article has a substantially smooth surface substantially devoid of rubber particles projecting through to the surface.

In aspects the article is a planter, box, container, hollow block, hollow beam, flooring type article or any type of desired decorative item such as outdoor statute and the like.

According to an aspect is a method of making a shaped article, the method comprising:

feeding a ground mixture of crumb rubber comprising EPDM and granular polyolefin into a barrel and screw extruder and heating said mixture to a temperature of about 150° C. to about 220° C.;

conveying the heated mixture along the barrel to a die to extrude a sheet;

cooling said sheet, wherein said sheet comprises a dispersed mixture of said crumb rubber within a polyolefin matrix;

grinding said sheet to a plurality of shaped particles and conveying said shaped particles along a second barrel through a nozzle into a mold to make a shaped article, wherein said shaped article has a substantially more evenly dispersed mixture of said crumb rubber within the matrix of said shaped article than within the matrix of said sheet or said plurality of shaped particles.

According to an aspect is a method of making a shaped article, the method consisting of:

feeding a ground mixture of crumb rubber comprising EPDM and granular polyolefin into a barrel and screw extruder and heating said mixture to a temperature of about 150° C. to about 220° C.;

conveying the heated mixture along the barrel to a die to extrude a sheet;

cooling said sheet, wherein said sheet comprises a dispersed mixture of said crumb rubber within a polyolefin matrix;

grinding said sheet to a plurality of shaped particles and conveying said shaped particles along a second barrel through a nozzle into a mold to make a shaped article, wherein said shaped article has a substantially more evenly dispersed mixture of said crumb rubber within the matrix of said shaped article than within the matrix of said sheet or said plurality of shaped particles.

In any aspect of the invention the crumb rubber may consist of EPDM.

DESCRIPTION OF THE INVENTION

Unless defined otherwise, all technical terms used herein have the same meaning as commonly understood by one of ordinary skill in the art to which the invention pertains. Although any methods and materials similar or equivalent to those described herein can be used in the practice for testing of the present invention, the typical materials and methods are described herein.

It is also to be understood that the terminology used herein is for the purpose of describing particular aspects only, and is not intended to be limiting.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20% or ±10%, more typically ±5%, even more typically ±1%, and still more typically ±0.1% from the specified value, as such variations are appropriate to perform the disclosed methods.

Registration, Evaluation, Authorisation and Restriction of Chemicals (REACH) is a European Union regulation dating from 18 Dec. 2006. REACH addresses the production and use of chemical substances, and their potential impacts on both human health and the environment. In accordance with the present invention, compliance with REACH provides that the methods described herein produce less than 1 ppm PAH during the processes and the products contain less than 1.0 ppm PAH.

An improved method is described for forming shaped articles for indoor and outdoor use whereby the shaped article comprises/consists of a substantially homogeneous distribution of crumb rubber within a polyolefin matrix throughout the entire shaped article. The methods in as aspect incorporate a double grind (regrind) of crumb rubber and thermoplastic material such that a variety of shaped articles can be made such as for example tiles, trays, mats, rolled rubber mats, doormats, paving stones, hollow paving stones, paving edges, planters of varied shapes and sizes, containers, decorative items such as statues and the like. For example, shaped articles made as planters for use in the outdoors, have desired characteristics such as one or more of desired substantially even surface texture, minimal porosity, are substantially pliable, durable and also substantially water and weather resistant.

Using conventional methodologies it is often difficult to form a product of rubber and polymer whereby the crumb rubber is substantially uniformly distributed (homogeneously distributed) within a carrier such as a polymer throughout the entire product in order that the final product has consistent mechanical, physical and visual properties. The present invention helps to alleviate this and provides a shaped article whereby the crumb rubber is more intimately mixed within the polymer such that the crumb rubber is substantially more evenly dispersed throughout the polymer matrix and within the entire final article. The present invention also provides such methods and shaped articles that are compliant with environmental standards.

Sheets/ribbons/mats and the like are fabricated/provided comprising/consisting of crumb rubber and polyolefin. These sheets/ribbons/mats are of crumb rubber dispersed within a polyolefin matrix. These are fabricated from a dry composition comprising, or in aspects consisting of or consisting essentially of, crumb rubber and granular polyolefin where this dry ground composition is made such that the crumb rubber is relatively evenly dispersed with the granular polyolefin. This composition, when fabricating a sheet or ribbon or mat, is then fed into a barrel containing a feed extrusion screw. The polymer resin is heated to temperatures of between 150° C. to about 220° C. to a molten state by the combination of heating elements and shear heating from the extrusion screw. The polyolefin as it melts forms a matrix about the crumb rubber which remains intact. This mixture is worked by the screw such that it has the crumb rubber substantially evenly dispersed throughout the molten polyolefin and this mixture is conveyed by the screw, or screws as the case with twin screw extrusion, forced through a die, and forming the mixture into an extrudate of a desired shape, in aspects a sheet/ribbon/mat. The extrudate is cooled and solidified after it is forced/pushed through the die of a desired cross section. In aspects, the die size is selected as desired for the resultant sheet. In aspects a ¼-½" die is used to create a ¼-½ inch thickness of sheet about up to 58" wide, or any desired width depending on the conveyor size. One of skill in the art would understand that the die size can vary and can be up to any size desired (such as up to about 2" thick, up to about 1" thick, up to about ¾" width, up to about ½" thick, and up to about ¼" thick) and that the width of the sheet can be any width only limited by the equipment and the desired amount of time for cooling the sheet. This extruded sheet is forwarded over rollers while allowing to cool prior to being machined into particles.

Machining can comprise one or more of grinding, milling, pulverizing and granulating so long as a plurality of particles forming a regrind (double ground) composition of a plurality of particles is formed. The size of the regrind may vary and can be up to about 80 mesh or less, 70 mesh or less, 60 mesh or less, 50 mesh or less, 40 mesh or less, 30 mesh or less, 20 mesh or less and up to 10 mesh or less. The regrind (double ground) composition of a plurality of particles is conveyed via a screw type plunger along a heated barrel at temperatures of between 150° C. to about 220° C. through a nozzle and into a mold cavity to make a shaped article that is cooled/allowed to cool. The resultant shaped article has substantially homogeneously dispersed crumb rubber with the matrix of the polyolefin throughout the formed shaped article as compared to the initial sheet or the particles of the regrind composition. This substantially more evenly dispersed mixture leads to more desirable properties of the shaped article and also a desired even esthetic look. As will be appreciated by one of skill in the art, shaped articles can have a complex design such that it may be difficult to have consistency in composition of matter throughout. The method of the invention helps to obviate this with the double grind processing such that end shaped articles are consistent with respect to composition of matter throughout.

In aspects, the compositions of the invention can comprise particles of crumb rubber comprising EPDM in a polyolefin matrix that is then admixed with particulate polyolefin to form a mixture for molding, in one aspect injection molding. In aspects, each particle of crumb rubber can comprise 100% EPDM or mixtures with SBR.

In a further embodiment of the invention, to the regrind composition may additionally be added granular polyolefin and/or granular EPDM and/or additives and/or colorants prior to injection molding. The amount will vary in accordance with the ranges provided herein. In yet still another further embodiment, regrind compositions having different ratios of crumb rubber and polyolefin can be mixed and then injection molded to provide a shaped article. Shaped articles can be fabricated by injection molding, extrusion molding, compression molding and rotational molding as would be understood by one of skill in the art. In aspects, injection molding is preferred.

The crumb rubber may be obtained from any variety of sources or suppliers and is often derived from old used tires or recycled rubber. In aspects rubber can be a synthetic rubber selected from styrene-butadiene rubber (SBR—a copolymer of syrene and butadiene), ethylene propylene diene rubber (EPDM—a terpolymer of ethylene, propylene and a diene-component), ethylene propylene rubber (EPR), butadiene rubber (BR) and mixtures thereof. Any rubber source can be of a recycled nature. In aspects the crumb rubber is granulated scrap/waste rubber from used tires (SBR). In further preferred aspects, the crumb rubber may comprise or consist of EPDM which has favourable properties in that it is a high density synthetic rubber that is extremely versatile and has desirable resistant properties against weathering, acids and alkali's. Some of EPDM's properties include: strong acid and alkali resistance; high temperature resistance up to 215° C.; flame retardant; excellent weathering properties; and a tensile range of 500-2500 P.S.I. EPDM is generally regarded as more environmentally friendly compared with crumb tire SBR rubber which contains higher zinc and polycyclic aromatic hydrocarbons (PAH) due to vulcanisation and thus higher level of PAH are released due to the high aromatic oils used to mix the total recipe of the tire rubber. Oils and fats of the skin can absorb PAH's and therefore lower PAH release levels are desired with the use of EPDM. With the use of EPDM in the present invention PAH emissions are less than about 1.0 ppm or less than about 0.5 ppm (or up to but less than 1.0 ppm PAH) using methodology for measuring/quantitating PAH emission as is understood by one of skill in the art. In aspects, the crumb rubber may be any mixture of SBR and EPDM in ratios that provide less than 1.0 ppm PAH in a final product.

The crumb rubber for use in the invention can be of a variety of mesh sizes, for example up to about 10, 11, 12, 13, 14, 15, 16, 17, 18, 19, 20, 21, 22, 23, 24, 25, 26, 27, 28, 29, 30, 35, 40, 45, 50, 55, 60, 65, 70, 75 and 80 mesh including combinations thereof. In aspects, the crumb rubber is up to about 10 mesh or up to about 20 mesh including combinations of mesh sizes up to about 20 mesh. Such crumb rubber has particle sizes of about 0.15 to about 1.70 mm (Aldrich 2003-2004 Catalog/Handbook of Fine Chemicals).

The polyolefin for use in the present invention is any polyolefin having a melt index ranging between about 5 g/10 minutes to about 50 g/10 minutes is suitable for use in the present invention. Representative examples are selected from the group consisting of polyethylene, polypropylene, polybutene, polyisoprene, polypentene and mixtures thereof. In aspects the polyolefin is polyethylene. In other aspects functionalized olefin polymers are not incorporated into the methods, compositions or shaped articles of the invention. The polyolefin for use in the first dry grind composition is particulate and can be of any desired size up to about 80 mesh.

When heated at temperatures of about 150° C. to about 220° C., inclusive of any specific temperature in between, the polyolefin will melt about the crumb rubber. Any temperature within this range is suitable for use in the method. In aspects the temperature is about 180° C., about 181° C., about 182° C., about 183° C., about 184° C., about 185° C., about 186° C., about 187° C., about 188° C., about 189° C., about 190° C., about 191° C., about 192° C., about 193° C., about 194° C., about 195° C., about 200° C., about 205° C., about 210° C., about 215° C. and about 220° C.

The amount of crumb rubber to polyolefin used in the method can range from about 20%:80% by weight to 80%:20% by weight. In aspects about 30-70% by weight of crumb rubber is used in the compositions, in aspects about 60% by weight, and about 50% by weight. In further aspects, 100% of the crumb rubber can be EPDM. In further aspects from about 25% to about 75% by weight EPDM. In further aspects about 5% by weight to about 60% by weight of the total amount of crumb rubber when mixed with other crumb rubber such as for example SBR. EPDM is provided in an amount to ensure compliance with REACH and provides further advantages of improved weatherability, surface appearance, structural integrity over time compared to SBR for example.

The amount of polyolefin used to make the compositions of the invention, sheet/ribbon or present in the final shaped article is about 15% to about 60% by weight, in aspects 15% to about 50% by weight, in aspects about 15% to about 40% by weight and in still further aspects about 50% by weight. One of skill in the art would understand that this would include amounts of about 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 58, 49, 50, 51, 52, 53, 54, 55, 56, 57, 58, 59 and 60% by weight.

The amount and type of crumb rubber and polyolefin selected for use will depend on the final type of shaped article for which certain properties would be desirable. For example for a planter embodiment a mix of about 50:50% by weight crumb rubber to polyolefin may be desirous in order to achieve a desired shore harness A (where less than 70 is soft; 70 is standard and 90 is stiff) as would be understood by one of skill in the art. This is but one representative example.

Up to about 10% by weight additives can be incorporated as desired to improve certain properties of the end product, as would be understood by a skilled person. These are selected from the group consisting of titanium dioxide, UV stabilizers, calcium carbonate, talc, flame retardants and combinations thereof. The additives can be incorporated into the extruded sheet or within the composition of plurality of shaped particles. Thus the additives are incorporated into the final shaped product. It is also understood that in embodiments of the invention, no additives are incorporated.

Up to about 10% by weight colorant can be incorporated either into the sheet or within the composition of plurality of shaped particles. Thus into the final product. It is also understood that in embodiments of the invention, no colorants are incorporated.

The method of the invention can be one continuous process or done in stages as desired. The method of the invention aims to more homogeneously distribute the crumb rubber whether SBR, EPDM or mixtures of both within the polymer matrix with each part of the method resulting in a finished article that is substantially consistant throughout with respect to its composition.

The invention provides in an aspect, environmentally safe rubber/polyolefin compositions for use to make desired shaped articles that are also environmentally safe and have desired esthetic and structural properties.

Aspects of the invention are;
1. A method of making a shaped article, the method comprising:
   machining a sheet/ribbon/mat comprising crumb rubber substantially evenly dispersed within a polyolefin matrix into a plurality of particles to form a reground mixture; and processing the reground mixture at an elevated temperature into a mold to form said shaped article, wherein the shaped article has a substantially homogeneously dispersed mixture of said crumb rubber within the matrix of said shaped article than within the matrix of said sheet or the particles of the reground mixture.

2. The method of claim 1, wherein the crumb rubber is up to about 10, 11, 12, 13, 14, 15, 16, 17, 18, 19, 20, 30, 40, 50, 60, 70 or 80 mesh and combinations thereof.

3. The method of claim 2, wherein the crumb rubber is up to about 20 mesh.

4. The method of any one of claims 1 to 3, wherein said crumb rubber is recycled rubber.

4a. The method of any one of claims 1 to 4, wherein the rubber is selected from the group consisting of styrene-butadiene rubber (SBR), ethylene propylene diene rubber (EPDM), ethylene propylene rubber (EPR), butadiene rubber (BR) and mixtures thereof.

4b. The method of claim 4a, wherein the rubber SBR from ground scrap/used tires.

4c. The method of claim 4a, wherein the rubber is EPDM.

4d. The method of claim 4c, wherein the EPDM provides reduced PAH emissions.

4e. The method of claim 4d, wherein the EPDM provides less than about 1.0 ppm PAH.

4f. The method of any one of claims 4c-4e, wherein the shaped article is one or more of UV stable, weather resistant, has a surface substantially devoid of voids, substantially even porosity, and substantially free of rubber particles through the surface.

5. The method of any one of claims 1 to 4e, wherein said polyolefin has a melt index ranging between about 5 g/10 minutes to about 50 g/10 minutes.

6. The method of claim 5, wherein said polyolefin is selected from the group consisting of polyethylene, polypropylene, polybutene, polyisoprene, polypentene and mixtures thereof.

7. The method of claim 6, wherein said polyolefin is polyethylene.

8. The method of claim 6, wherein said polyolefin is polypropylene.

9. The method of any one of claims 1 to 7, wherein the crumb rubber is provided in a range of about 20%-80% by weight, or 30-70% by weight, or 40-60% by weight, or 45-60% by weight, or 50% by weight, or 55% by weight in said sheet and/or shaped article.

10. The method of claim 9, wherein said crumb rubber is provided in a range of about 40% to 60% by weight in said sheet/ribbon/mat and/or shaped article.

11. The method of claim 10, wherein said crumb rubber is provided in an amount of about 50% by weight in said sheet/ribbon/mat and/or shaped article.

12. The method of any one of claims 1 to 11, wherein about 15% to 60% or 15% to about 40% polyolefin is provided in said sheet/ribbon/mat and/or shaped article.

13. The method of claim 12, wherein about 50% by weight polyolefin is provided in said sheet/ribbon/mat and/or shaped article.

14. The method of any one of claims 1 to 13, wherein said sheet/ribbon/mat and/or said shaped article further comprises up to about 10% by weight additives.

15. The method of claim 14, wherein said additives are selected from the group consisting of titanium dioxide, UV stabilizers, calcium carbonate, talc, flame retardants and mixtures thereof.

16. The method of any one of claims 1 to 15, wherein said sheet/ribbon/mat and/or shaped article further comprises up to about 10% by weight colorants.

17. The method of any one of claims 1 to 16, wherein said elevated temperature is about 150° to about 220° C.

18. The method of any one of claims 1 to 17, wherein said sheet is fabricated from a mixture of crumb rubber and pelletized polyolefin.

19. The method of any one of claims 1 to 18, wherein machining is selected from grinding, milling, pulverizing, and/or granulating.

20. The method of any one of claims 1 to 18, wherein processing comprises injection molding, rotational molding, compression molding and/or rotational molding.

21. The method of claim 20, wherein said processing is injection molding using a barrel and screw.

22. The method of any one of claims 1 to 21, wherein said sheet has a thickness of up to about 2", up to about 1.5", up to about 1", up to about ½" or up to about ¼.

23. The method of any one of claims 1 to 22, wherein said sheet is formed by extrusion of a mixture of said crumb rubber and granular polyolefin.

24. A shaped article made by the method of any one claims 1 to 23.

25. A shaped article comprising an injection molded composition of a substantially homogeneous mixture of reground rubber crumb within a reground polyolefin matrix, wherein said reground rubber crumb is substantially evenly distributed within the reground polyolefin matrix.

25a. A shaped article comprising a composition of a substantially homogeneous mixture of ground EPDM rubber crumb within a polyolefin matrix, wherein said ground EPDM rubber crumb is substantially evenly distributed within the reground polyolefin matrix, wherein said shaped article comprises less than 1 ppm PAH.

25b. A shaped article comprising a composition of a substantially homogeneous mixture of ground SBR and EPDM rubber crumb within a polyolefin matrix, wherein said ground SBR and EPDM rubber crumb is substantially evenly distributed within the reground polyolefin matrix, wherein said shaped article comprises less than 1 ppm PAH.

25c. The shaped article of claim 25a or 25b, wherein the PAH is selected from the group consisting of benzo[a]pyrene, benzo[e]pyrene, benzo[a]anthracene, chrysen, benzo[b]fluoranthene, benzo[j]fluoranthene, benzo[k]fluoranthene, dibenzo[a,h]anthracene, indeno(1,2,3-cd)pyrene, acenaphthene, fluorene, acenophthylene, phenanthrene, pyrene, anthracene, fluranthene, naphthalene and mixtures thereof.

25d. The shaped article of any one of claims 25a to 25c wherein said article complies with REACH requirements and is environmentally friendly.

26. The shaped article of any one of claims 25 to 25d, wherein said article is pliable.

27. The shaped article of any one of claims 25 to 26, wherein said article is substantially water resistant.

28. The shaped article of any one of claims 25 to 27, wherein said article has a substantially even surface texture.

28a. The shaped article of claim 28, wherein said surface texture is substantially devoid of voids, has an even and decreased surface porosity, and substantially smooth surface whereby rubber crumb does not protrude from the surface of the shaped article.

28b. The shaped article of claim 25, wherein the reground rubber crumb comprises a rubber selected from the group consisting of styrene-butadiene rubber (SBR), ethylene propylene diene rubber (EPDM), ethylene propylene rubber (EPR), butadiene rubber (BR) and mixtures thereof.

28c. The shaped article of claim 28b, wherein the rubber SBR from ground scrap/used tires.

28d. The shaped article of claim 28a, wherein the rubber comprises EPDM.

28e. The shaped article of claim 28d, wherein the EPDM provides reduced PAH content.

28f The shaped article of claim 28e, wherein the EPDM provides less than about 1.0 ppm or less than about 0.5 ppm PAH content.

29. A method of making a shaped article, the method comprising:
feeding a ground mixture of crumb rubber and granular polyolefin into a barrel and screw extruder and heating said mixture to a temperature of about 150° C. to about 220° C.;
conveying the heated mixture along the barrel to a die to extrude a sheet;
cooling said sheet, wherein said sheet comprises a dispersed mixture of said crumb rubber within a polyolefin matrix;
grinding said sheet to a plurality of shaped particles and conveying said shaped particles along a second barrel through a nozzle into a mold to make a shaped article, wherein said shaped article has a substantially more evenly dispersed mixture of said crumb rubber within the matrix of said shaped article than within the matrix of said sheet or said plurality of shaped particles.

30. The method of claim 29, wherein the crumb rubber is up to about 10, 11, 12, 13, 14, 15, 16, 17, 18, 19, 20, 30, 40, 50, 60, 70 or 80 mesh.

31. The method of claim 30, wherein the crumb rubber is up to about 20 mesh.

32. The method of any one of claims 29 to 31, wherein said crumb rubber is recycled rubber.

32a. The method of any one of claims 29 to 31, wherein the rubber is selected from the group consisting of styrene-butadiene rubber (SBR), ethylene propylene diene rubber (EPDM), ethylene propylene rubber (EPR), butadiene rubber (BR) and mixtures thereof.

32b. The method of claim 32a, wherein the rubber SBR from ground scrap/used tires.

32c. The method of claim 32a, wherein the rubber is EPDM.

32d. The method of claim 32c, wherein the EPDM provides reduced PAH emissions.

32e. The method of claim 32d, wherein the EPDM provides less than about 1.0 ppm PAH emission.

33. The method of any one of claims 29 to 32e, wherein said polyolefin has a melt index ranging between about 5 g/10 minutes to about 50 g/10 minutes.

34. The method of claim 33, wherein said polyolefin is selected from the group consisting of polyethylene, polypropylene, polybutene, polyisoprene, polypentene and mixtures thereof.

35. The method of claim 34, wherein said polyolefin is polyethylene.

36. The method of claim 34, wherein said polyolefin is polypropylene.

37. The method of any one of claims 29 to 36, wherein the crumb rubber is provided in a range of about 50%-80% by weight in said sheet and/or shaped article.

38. The method of claim 37, wherein said crumb rubber is provided in a range of about 40% to 60% by weight in said sheet and/or shaped article.

39. The method of claim 38, wherein said crumb rubber is provided in an amount of about 50% by weight in said sheet and/or shaped article.

40. The method of any one of claims 29 to 39, wherein about 15% to 50% or 15% to about 40% polyolefin is provided in said sheet and/or shaped article.

41. The method of claim 40, wherein about 50% by weight polyolefin is provided in said sheet and/or shaped article.

42. The method of any one of claims 29 to 41, wherein up to about 10% by weight additives is added to said ground mixture of crumb rubber and granular polyolefin and/or said plurality of shaped particles.

43. The method of claim 42, wherein said additives are selected from the group consisting of titanium dioxide, UV stabilizers, calcium carbonate, talc and flame retardants.

44. The method of any one of claims 29 to 43, wherein up to about 10% by weight colorants is added to said ground mixture of crumb rubber and granular polyolefin and/or said plurality of shaped particles.

45. The method of any one of claims 29 to 44, wherein said sheet has a thickness of up to about 2", up to about 1.5", up to about 1", up to about ¾", up to about ½", and up to about ¼".

46. The method of any one of claims 1 to 23 and 29 to 45, wherein said shaped article is a planter or container.

47. The shaped article of any one of claims 24 to 28, wherein said shaped article is a planter or container.

48. A double ground composition comprising a plurality of particles, wherein each particle has crumb rubber dispersed within a polyolefin matrix.

48a. The double ground composition of claim 48, wherein the crumb rubber comprises EPDM.

48b. The double ground composition of claim 48, wherein the crumb rubber consists of EPDM and has less than 1.0 ppm PAH.

49. A method of making a shaped article, the method consisting of:
machining a sheet comprising crumb rubber substantially evenly dispersed within a polyolefin matrix into a plurality of particles to form a reground mixture; and
processing the reground mixture at an elevated temperature into a mold to form said shaped article,
wherein the shaped article has a substantially homogeneously dispersed mixture of said crumb rubber within the matrix of said shaped article than within the matrix of said sheet or the particles of the reground mixture.

50. A shaped article consisting of an injection molded composition of a substantially homogeneous mixture of reground rubber crumb comprising EPDM within a reground polyolefin matrix, wherein said reground rubber crumb is substantially evenly distributed within the reground polyolefin matrix.

51. A method of making a shaped article, the method consisting of:
feeding a ground mixture of crumb rubber and granular polyolefin into a barrel and screw extruder and heating said mixture to a temperature of about 150° C. to about 220° C.;
optionally adding colorants and additives;
conveying the heated mixture along the barrel to a die to extrude a sheet;
cooling said sheet, wherein said sheet comprises a dispersed mixture of said crumb rubber within a polyolefin matrix;
grinding said sheet to a plurality of shaped particles and conveying said shaped particles along a second barrel through a nozzle into a mold to make a shaped article, wherein said shaped article has a substantially more evenly dispersed mixture of said crumb rubber within the matrix of said shaped article than within the matrix of said sheet or said plurality of shaped particles.

52. A method of making a shaped article, the method comprising:
  feeding a ground mixture of crumb rubber comprising EPDM and granular polyolefin into a barrel and screw extruder and heating said mixture to a temperature of about 150° C. to about 220° C.;
  conveying the heated mixture along the barrel to a die to extrude a sheet;
  cooling said sheet, wherein said sheet comprises a dispersed mixture of said crumb rubber within a polyolefin matrix;
  grinding said sheet to a plurality of shaped particles and conveying said shaped particles along a second barrel through a nozzle into a mold to make a shaped article, wherein said shaped article has a substantially more evenly dispersed mixture of said crumb rubber within the matrix of said shaped article than within the matrix of said sheet or said plurality of shaped particles.

53. A method of making a shaped article, the method consisting of:
  feeding 20-80% by weight of a rubber crumb comprising a mixture of EPDM and SBR and about 15% to 60% by weight granular polyolefin into a barrel and screw extruder and heating said mixture to a temperature of about 150° C. to about 220° C.;
  conveying the heated mixture along the barrel to a die through a nozzle into a mold to make a shaped article, wherein said shaped article has a substantially more evenly dispersed mixture of said crumb rubber comprising EPDM within the matrix of said shaped article than within the matrix of said sheet or said plurality of shaped particles.

54. The method of claim 52 or 53, wherein the crumb rubber consists of EPDM.

54a. The method of claim 53 or 54, wherein each of the crumb rubber particles comprises EPDM and SBR in a polyolefin matrix.

55. A method of making an environmentally friendly thermoplastic composition for injection molding comprising:
  mixing in a hopper or container about 25-75% by weight EPDM crumb with about 15-60% by weight polyolefin, up to about 10% by weight additives, and up to about 10% by weight colorants,
  and heating the mixture to form a composition whereby the EPDM crumb is essentially homogenously mixed throughout the polyolefin;
  wherein the composition comprises less than 1.0 ppm PAH.

56. The method of claim 55, wherein the composition is injected molded or extruded into a shaped product.

57. The method of claim 56, wherein said shaped product is machined into crumb, said machined crumb being further combined with ground rubber and ground polyolefin.

It is understood by one of skill in the art that the examples provided herein are only for illustration and do not in any way limit the invention as described herein.

EXAMPLES

Example 1

A 50:50 dry mix of crumb rubber and granular polypropylene wherein in this ground composition the crumb rubber relatively evenly dispersed with the granular polyolefin. This composition was fed into an extruder where the screw mixed and melted the polypropylene at a temperature of 180° C. and advanced the mixture towards a die opening creating a wide ¼" thick sheet which was cooled as it advanced on rollers. This resulted in a ¼" thick and 58" wide sheet fabricated by extrusion.

The cooled sheet was fed into a grinder creating a regrind composition of particles of crumb rubber substantially evenly dispersed within the melted polypropylene matrix that was collected for feeding into a hopper of an injection molding machine where the regrind composition was injected molded under heating conditions into a planter mold and then allowed to cool before being removed from the mold.

The resulting molded planter exhibited substantially homogeneous distribution of the crumb rubber within the polyolefin matrix and had advantageous properties, such as reduced porosity, a smooth even surface texture and good durability.

Example 2

A 50:50 dry mix of crumb rubber and granular polypropylene wherein in this ground composition the crumb rubber relatively evenly dispersed with the granular polyolefin. This composition was fed into an extruder where the screw mixed and melted the polypropylene at a temperature of 180° C. and advanced the mixture towards a die opening creating a wide ½" thick sheet which was cooled as it advanced on rollers of a conveyor. This resulted in a ½" thick and 58" wide sheet fabricated by extrusion.

The cooled sheet was fed into a grinder creating a regrind composition of particles of crumb rubber substantially evenly dispersed within the melted polypropylene matrix that was collected and fed into a hopper of an injection molding machine where the regrind composition was mixed under heat and advanced in the barrel to be injected molded into a planter mold and then allowed to cool before being removed from the mold.

The resulting molded planter exhibited substantially homogeneous distribution of the crumb rubber within the polyolefin matrix and had advantageous properties, such as reduced porosity, a smooth even surface texture and good durability. Cross sectional inspection of the finished article showed a substantially homogeneous dispersion of the crumb rubber throughout the polymer matrix throughout the entire finished article.

Example 3

Examples 1 and 2 were conducted using crumb rubber from scrap/recycled tires (SBR) and then conducted using EPDM. Rates of PAH emissions being tested for SBR crumb rubber versus EPDM rubber to show decreased PAH emission using EPDM in the methods.

Example 4

Various ratios of dry mix of EPDM crumb rubber and granular polypropylene were made, using 25% to 75% EPDM as well as mixtures of 5-15% to 20-60% by weight EPDM with the remainder being SBR up to about a total of 80% by weight rubber in the composition and thus in the final product. The composition was fed into a hopper through a barrel and screw at a temperature of 180° C. for intimate mixing and then through a nozzle where it was injected into a mold and then allowed to cool.

The products were tested and each product was shown to have less than 1.0 ppm PAH. The PAH tested were one or more of benzo[a]pyrene, benzo[e]pyrene, benzo[a]anthracene, chrysen, benzo[b]fluoranthene, benzo[j]fluoranthene, benzo[k]fluoranthene, dibenzo[a,h]anthracene, indeno(1,2,3-cd)pyrene, acenaphthene, fluorene, acenophthylene, phenanthrene, pyrene, anthracene, fluranthene, naphthalene.

All tested samples had less than 1 mg/kg PAH in relation to the weight of material with an admixture of PAH. Products containing more EPDM to SBR had a total content of less than 0.5 ppm PAH

We claim:

1. A method of making a shaped article, the method comprising:
   providing a composition comprising a plurality of particles wherein each particle comprises crumb rubber dispersed within a polyolefin matrix; and
   processing the composition at an elevated temperature into a mold to form said shaped article,
   wherein the shaped article has a more substantially homogeneous dispersion of said crumb rubber within the polyolefin matrix throughout the entire shaped article compared to the composition of the plurality of particles or each of said particles.

2. The method of claim 1, wherein the particles have mesh sizes in a range of up to 80 mesh.

3. The method of claim 2, wherein said crumb rubber is synthetic or recycled styrene-butadiene rubber (SBR), ethylene propylene diene rubber (EPDM), ethylene propylene rubber (EPR), butadiene rubber (BR) and mixtures thereof.

4. The method of claim 3, wherein the crumb rubber comprises: SBR; EPDM that provides reduced polycyclic aromatic hydrocarbon (PAH) emissions; or a mixture of SBR and EPDM that provides reduced PAH emissions.

5. The method of claim 4, wherein the SBR is recycled rubber from ground scarp/used tires.

6. The method of claim 4, wherein the reduced emissions are less than about 1.0 ppm PAH.

7. The method of claim 1, wherein the shaped article exhibits one or more of the following properties: UV stable, weather resistant, has a surface substantially devoid of voids, substantially even porosity, substantially reduced porosity and substantially free of rubber particles extending through the surface of the shaped article.

8. The method of claim 1, wherein said polyolefin has a melt index ranging between about 5 g/10 minutes to about 50 g/10 minutes.

9. The method of claim 8, wherein said polyolefin is polyethylene, polypropylene, polybutene, polyisoprene, polypentene, or mixtures thereof.

10. The method of claim 9, wherein said polyolefin is polyethylene or polypropylene.

11. The method of claim 1, wherein the crumb rubber is provided in a range of about 20% to about 80% by weight in said composition and/or the shaped article.

12. The method of claim 1, wherein the polyolefin is provided in a range of about 20% to about 80% by weight in said particles and/or the shaped article.

13. The method of claim 12, wherein the crumb rubber comprises: up to 100% by weight EPDM, wherein any remainder is SBR.

14. The method of claim 1, further comprising adding one or more of granular polyolefin, granular SBR, and granular EPDM to the composition prior to the processing.

15. The method of claim 1, further comprising adding additives and/or colorants prior to or during processing of the composition,
   wherein the additives are provided in an amount of up to about 10% by weight and are selected from the group consisting of titanium dioxide, UV stabilizers, calcium carbonate, talc, flame retardants and mixtures thereof;
   wherein the colorants are provided in an amount of up to about 10% by weight.

16. The method of claim 1, wherein said elevated temperature is about 150° C. to about 220° C.

17. The method of claim 1, wherein processing comprises one or more of:
   injection molding using a barrel and screw;
   rotational molding;
   compression molding; and
   rotational molding.

18. The method of claim 1, wherein said composition is made by:
   feeding a mixture of crumb rubber and granular polyolefin into a barrel and screw extruder and heating said mixture to a temperature of about 150° C. to about 220° C.;
   conveying the heated mixture along the barrel to a die to extrude a sheet or ribbon;
   cooling said sheet or ribbon, wherein said sheet or ribbon comprises crumb rubber dispersed within a polyolefin matrix; and
   grinding said sheet or ribbon to form said composition.

19. The method of claim 1, wherein said composition is made by:
   grinding materials comprising crumb rubber and polyolefin to form a plurality of particles, and optionally adding crumb rubber and/or granular polyolefin to the materials during grinding.

20. A shaped article made by the method of claim 1, wherein said shaped article has a substantially homogeneous dispersion of the crumb rubber throughout the polyolefin matrix and throughout the shaped article.

21. The shaped article of claim 20, wherein said article is substantially water resistant, has a substantially even surface texture devoid of voids, has an even and decreased surface porosity, and substantially smooth surface whereby crumb rubber does not substantially protrude from the surface of the shaped article.

22. The shaped article of claim 20, wherein said shaped article is compliant with REACH (Registration, Evaluation, Authorisation, and Restriction of Chemicals) exhibiting less than 1 ppm PAH.

23. The shaped article of claim 20, wherein said article is a container or a planter.

24. A method of making a shaped article, the method comprising:
   grinding an article comprising crumb rubber in a polyolefin matrix having a first homogeneity with respect to uniformity of distribution of the crumb rubber within the matrix to make a composition of particles, each particle having a more even dispersion of the crumb rubber with the polyolefin matrix than the first homogeneity of the mixture; and
   heating and conveying said composition along a barrel through a nozzle into a mold to make a shaped article, wherein said shaped article has a substantially more homogeneous dispersion of said crumb rubber within the polyolefin matrix and within the entire shaped article compared to that of each particle of the composition or the first homogeneity of the article.

25. The method of claim 24, wherein the crumb rubber is provided with mesh sizes in a range of up to 80 mesh.

26. The method of claim 24, wherein the crumb rubber comprises synthetic or recycled: styrene-butadiene rubber (SBR), ethylene propylene diene rubber (EPDM), or a mixture of SBR and EPDM, wherein EPDM decreases PAH emissions.

27. The method of claim 26, wherein the crumb rubber is provided with mesh sizes in a range of about 20% to about 80% by weight in said composition and/or the shaped article.

28. The method of claim 24, wherein the polyolefin is provided in a range of about 15% to about 80% by weight in said particles and/or the shaped article.

29. The method of claim 24, wherein the crumb rubber comprises: up to 100% by weight EPDM, wherein any remainder is SBR.

30. The method of claim 24, further comprising adding prior to or during heating of the composition, one or more of granular polyolefin, granular SBR, granular EPDM, additives, and colorants.

* * * * *